(12) United States Patent
Batistic

(10) Patent No.: US 6,223,115 B1
(45) Date of Patent: *Apr. 24, 2001

(54) METHOD OF IMPROVING ABS CONTROL BEHAVIOR

(75) Inventor: Ivica Batistic, Frankfurt am Main (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/214,949

(22) PCT Filed: Apr. 18, 1997

(86) PCT No.: PCT/EP97/01955

§ 371 Date: Jul. 7, 1999

§ 102(e) Date: Jul. 7, 1999

(87) PCT Pub. No.: WO98/03379

PCT Pub. Date: Jan. 29, 1998

(30) Foreign Application Priority Data

Jul. 18, 1996 (DE) ............................................. 196 28 973

(51) Int. Cl.⁷ ............................... G06F 7/00; G06F 17/00
(52) U.S. Cl. ................................ 701/72; 701/70; 701/83; 701/91; 303/186; 303/189; 303/901
(58) Field of Search .................................. 701/70, 71, 72, 701/74, 78, 83, 89, 91; 340/444; 180/197; 303/163, 165, 186, 189, 901

(56) References Cited

U.S. PATENT DOCUMENTS

| | | | | |
|---|---|---|---|---|
| 5,140,524 | * | 8/1992 | Matsuda | 701/72 |
| 5,270,933 | * | 12/1993 | Fennel et al. | 701/74 |
| 5,669,679 | * | 9/1997 | Hammoud et al. | 303/165 |
| 5,691,900 | * | 11/1997 | Luckevich et al. | 701/41 |
| 5,694,321 | * | 12/1997 | Eckert et al. | 701/91 |
| 5,774,821 | * | 6/1998 | Eckert et. al. | 701/78 |
| 5,863,105 | * | 1/1999 | Sano | 303/146 |
| 6,012,010 | * | 1/2000 | Batistic et al. | 701/72 |

* cited by examiner

*Primary Examiner*—William A. Cuchlinski, Jr.
*Assistant Examiner*—Gertrude Arthur
(74) *Attorney, Agent, or Firm*—Rader, Fishman & Grauer PLLC

(57) ABSTRACT

In order to improve the control behavior of an ABS control system wherein, instead of the standard control mode, a special control mode or rather corner control mode comes into operation when a cornering situation is identified, said special control mode or corner control mode causing a reduction of the braking pressure on the front wheel and/or on the rear wheel on the inside of the corner, the gradient of the braking pressure build-up on the wheel on the inside of the corner is reduced in the partial braking range when a threshold value ($th_1$, $th_2$) of a wheel speed difference (SD) is exceeded, which difference is the difference between the wheel speed sums per side formed from the wheel speeds of the two wheels of one side of the vehicle, the reduction taking place in dependence on the extent by which the threshold value ($th_1$, $th_2$) is exceeded.

4 Claims, 3 Drawing Sheets

METHOD OF IMPROVING ABS CONTROL BEHAVIOR

BACKGROUND OF THE INVENTION

This invention relates to a method for improving the control behavior of an anti-lock control system and more particularly for improving the steerability of the vehicle and the driving stability during cornering, wherein a vehicle reference speed is derived and criteria for identifying a cornering situation and the direction of cornering are obtained from the rotational behavior of the vehicle wheels wherein, instead of the standard control mode, a special control mode or rather a corner control mode starts operating or is put into operation, respectively, when a cornering situation is identified, said special control mode or cornering control mode producing a reduction of the braking pressure on the front wheel on the inside of the corner and/or on the rear wheel on the inside of the corner already in the partial braking range.

In a cornering identification system, with a method of control of the type presently mentioned, the pressure relief of the wheels on the inside of a corner generates a yawing moment around the vertical axis of the vehicle which balances and stabilizes the cornering situation. With control coming on during a partial braking operation, the braking pressure on the wheels on the outside of the corner will be kept constant or will automatically increase due to the cut-off of any further build-up of braking pressure on the wheel or wheels on the inside of the corner.

From DE 34 13 738 C2 (P 5547) there is already known an anti-lock control system (ABS) with a cornering identification circuit likewise based on wheel slip measurement. For the purpose of identifying a cornering situation the slip values of the wheels of one vehicle side are added up and compared with the slip sum of the wheels of the other vehicle side and a cornering identification signal will be generated as soon as the difference between the slip sums exceeds a predetermined limit value. Selection criteria such as "select low" or "select high" criteria, according to which the pressure variation is controlled in the individual braking pressure control channels of this brake system, and limit values for the coming-on of these selection criteria will be varied when a cornering situation is identified. In this way, control is to be adapted to the varying conditions during straight-onwards driving and during cornering.

It is known from older DE 21 19 590 A1 to obtain a cornering identification signal by means of a transverse acceleration measuring device such as a mercury switch.

It is further already known to expand the functions of an ABS control system in that the system is used for improving the driving and braking stabilities in corners. This is done in that a stabilizing moment is generated around the vertical axis of the vehicle by means of a calculated deceleration of the build-up of the braking pressure on the wheels on the inside of the corner as compared with the braking pressure on the wheels on the outside of the corner during cornering and a partial braking operation, i.e. during a braking operation, where ABS response threshold values are not reached ("Bremsanlage und Schlupf-Regelsystem der neuen 7er-Reihe von BMW", ATZ 97 (1995), pages 8–15; and "Bremsanlage und Schlupf-Regelungssysteme der neuen Baureihe 5 von BMW", ATZ 98 (1996), pages 188–194 ["Brake system and slip control system of BMW's new no. 7 line of models {ATZ auto journal, 97 (1995), pages 8–15}; and "Brake system and slip control systems of BMW's new no. 5 line of models" {ATZ auto journal, 98 (1996), pages 188–194}]). With no steering angle sensor being used, the information on the current steering angle is derived from the transverse acceleration which, on its part, is calculated from the wheel sensor signals.

It is thus an object of the present invention to develop a method of the type referred to above which will provide a marked contribution to improving the driving behavior and stabilization, respectively, of the vehicle by means of reliable cornering identification and reaction to this situation.

SUMMARY OF THE INVENTION

It has been found out that this object is achieved by a method the particular features of which consist in that the gradient of the braking pressure build-up on the front wheel and/or on the rear wheel on the inside of the corner is reduced in the partial braking range when a threshold value of a wheel speed difference is exceeded, which difference is the difference between the wheel speed sums per side formed from the speeds of the two wheels of one side of the vehicle, the reduction taking place in dependence on the extent by which the threshold value is exceeded.

In practice, pressure management of the front wheels is of particular importance in the special control mode or rather in the corner control mode. As a rule, while reducing the braking pressure on the wheel on the inside of the corner it is beneficial to simultaneously increase the braking pressure on the wheel on the outside of the corner.

Thus, according to this invention, a wheel speed difference threshold value is used for identifying a cornering situation and for calculating and reducing, respectively, the further pressure build-up on the wheel on the inside of the corner the amount of which value, according to a preferred example of an embodiment of this invention, is varied in dependence on the vehicle speed. Below the threshold value, there applies the maximum value of the braking pressure build-up gradient. The extent by which the threshold value is exceeded determines the reduction of the gradient which may fall from the original maximum value down to a very low value or, practically, may sink down to the value of zero.

According to another example of an embodiment of this invention, the reduction of the braking pressure gradient is adjusted by going over to a pulse-shaped introduction of braking pressure and by varying the pulse-and-pulse-pause ratio by means of which an inlet valve will be actuated.

Thus, this invention relates to the braking pressure correction on the wheel on the inside of the corner, more particularly on the front wheel, in order to enhance the steerability and driving stability during cornering for the purpose of increasing the stability of the vehicle and improving the braking stability under transverse-dynamic influences in the partial braking range. There will be generated a stabilizing moment around the vertical axis of the automotive vehicle.

Any further details and applications of this invention will become evident from the following description of examples of embodiments, reference being made to the accompanying Figures.

DETAILED DESCRIPTION OF THE DRAWINGS

The block diagram is schematically simplified as are the flow chart and the graphs in order to illustrate what is essential in this invention.

Figure 1:
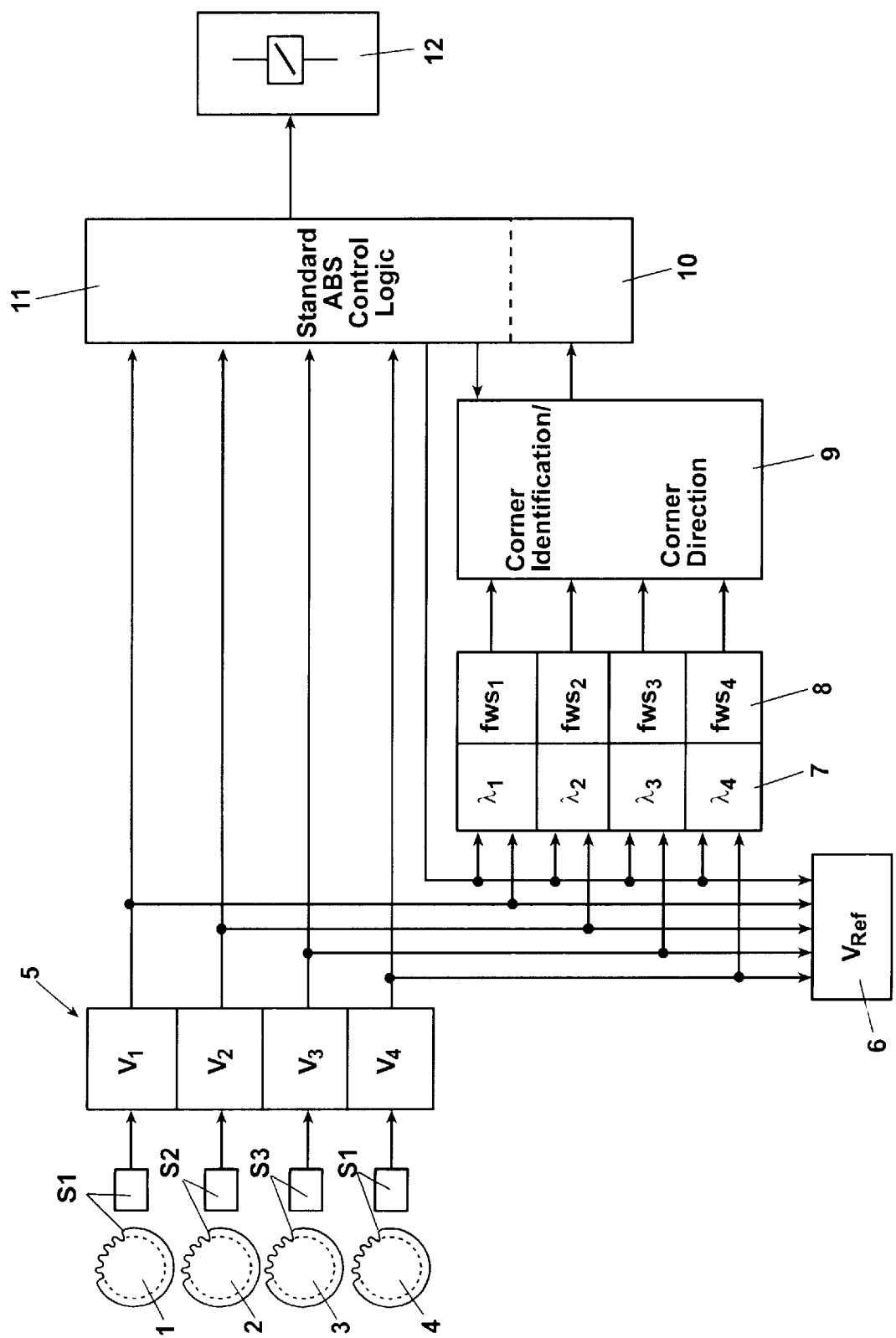
FIG. 1 is a block diagram of the essential electronic components or functional blocks of an ABS control system that is expanded for implementing the inventive method.

FIG. 1 represents the fundamental mode of operation of a circuit configuration for anti-lock control expanded by components for improving the control behavior during cornering.

The input information of the control system is obtained by means of wheel sensors S1 through S4. To this end, the individual (non-illustrated) vehicle wheels are equipped with transmitters or toothed disks 1–4 rotating with the vehicle wheels and generating an output signal in the transducers, i.e., the stationary components of sensors S1–S4. These output signals represent the rotational behavior of the individual wheels in a manner known per se.

After processing the sensor output signals in a circuit 5, there are available the wheel speed signals $v_1$–$v_4$. By means of logical combination of the output signals of circuit 5, namely of the speed signals $v_1$–$v_4$, in a linking circuit 6, a reference speed $v_{Ref}$ of the vehicle is formed which, above all, serves as a reference value for determining the wheel slip $8_1$ through $8_4$ of the individual vehicle wheels and, hence, also as a reference value for braking pressure modulation.

A circuitry block 7 contains the individual circuits for determining the wheel slip $8_1$ through $8_4$ by comparing the reference speed of the vehicle with the respective wheel speed $v_1$–$v_4$. As is known, the wheel slip results from the difference $$8_i = v_{Ref} - v_i, \text{ with } i=1\ldots 4.$$

With a program-controlled circuitry being used such as a microcomputer or microcontroller, block 7 symbolizes the program steps for calculating the slip $8_i$ of the individual vehicle wheels.

In a circuitry block 8, each slip signal passes a low-pass filter the filtering time constant of which may lie in the order of magnitude of 50–200 msecs; in our example the time constant lies at 70 msecs. The circuitry block 8 transmits a filtered wheel slip signal $fws_i$ and passes this output signal on to a corner identification circuit 9, respectively.

In the corner or cornering identification circuit 9, the current and the filtered wheel slip signals are analyzed and evaluated, with cornering identification taking place in accordance with qualitative and quantitative criteria. The direction of the corner is likewise determined by evaluating and logically combining the slip signals and the slip difference signals. The result of this slip evaluation by means of circuit 9 then leads to the adaptation of anti-lock control to the particular conditions of cornering, this being done via an additional circuit 10, namely a circuit in addition to the actual standard ABS control logic 11. Now, a special control or corner control will take place instead of standard control.

The output of the control logic 11 leads to the actuators or modulators 12 via non-represented processing and evaluating circuits, the braking pressure of a brake system being managed as required by means of these actuators or modulators 12. In the present-day anti-lock control systems, the actuators 12 used are mainly electromagnetically actuatable hydraulic valves for modulating and controlling the braking pressure in the individual wheel brakes.

Of course, the actual ABS control logic is likewise based on the evaluation of the processed wheel speed signals $v_1$–$v_4$, with the reference speed $v_{Ref}$ of the vehicle being taken into consideration.

Figure 2:
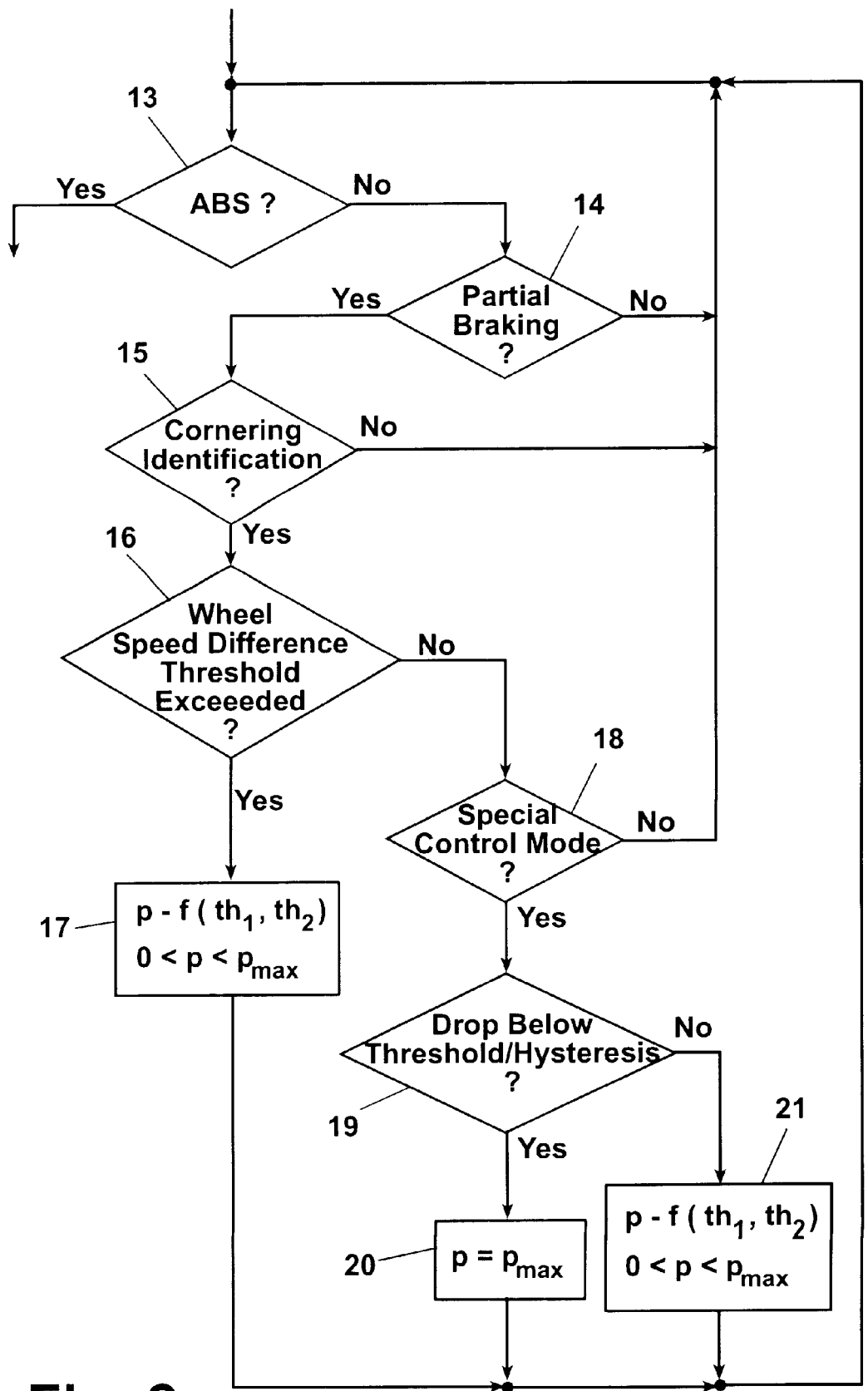
FIG. 2 is a flow chart of the individual steps of the program run or of the logical operations of the inventive method.

As already mentioned, the functions of a circuit configuration as per FIG. 1 can be realized by program-controlled circuits and by the program run, respectively. Nowadays, such controller technology is preferred. Therefore, in the form of a flow chart, FIG. 2 shows the program run which transforms the inventive method into control steps. These functions, steps and logical operations are mainly sited in the cornering identification circuit 9.

FIG. 2 shows a detail of an ABS control program.

The inventive special program takes place outside actual anti-lock control. If ABS control takes place (J=ja=YES) thus, following diamond 13, standard control will continue. However, if the answer is "NO" (N), if thus ABS control is not in operation and if, according to branch point 14, there is indeed a braking operation (partial braking: J=ja=YES) the further process of decision will depend on whether or not a cornering situation was identified (15: YES). Now it must be found out whether or not a predetermined wheel-speed-difference threshold value SD (branch point 16) was exceeded. This operation, or rather this threshold value, will be explained in more detail in the following with reference to FIG. 3.

If the threshold was exceeded the braking pressure build-up gradient of the wheel on the inside of the corner, in particular of the front wheel on the inside of the corner, will be adapted or rather varied in correspondence with circumstances via the "YES"-output of the decision point 16. This operation is symbolized by reference numeral 17 in FIG. 2.

The braking pressure build-up gradient is generally expressed by the formula $$p = f(th_1, th_2, th_3)$$

$$0 < p < p_{max}$$

This equation will be explained in more detail with reference to FIG. 3.

If the threshold was not exceeded (16: N), the further program run will depend, in accordance with decision point 18, on whether or not the special control mode already has led to a management of the braking pressure reduction gradient. In case of "NO" (output N of branch point 18), the program run will lead back to the starting point. In case of "YES" and if there was again a drop below the threshold value $th(th_1, th_2, th_3)$ and, additionally, below a tolerance value or a hysteresis value, i.e., below the value: "threshold minus hysteresis" (branch point 19: J=YES), the braking pressure build-up will be continued with the maximum gradient $p = p_{max}$ as symbolized by operation 20 because the need for special control caused by cornering has practically come to an end. A hysteresis value of 2 to 6 k.p.h. has proved advantageous in one example of an embodiment of this invention. If there is a drop below the threshold value th by such an amount this will lead to the termination of special control. The hysteresis value is not represented in FIG. 3.

If the answer to question 19 is "NO", the braking pressure manipulation in functional block 21 will be performed in the same manner as in step 17 (operator 17): The manipulation of the braking pressure build-up gradient or rather the reduction of the build-up gradient will be continued in order to improve driving stability.

Thus, as explained with reference to the flow chart of FIG. 2, a partial braking operation outside ABS control is a prerequisite of the inventive braking pressure manipulation on the wheel on the inside of the corner. Of decisive importance is the slip or wheel-speed-difference threshold which, according to FIG. 3, varies in dependence on the vehicle speed or on the reference speed of the vehicle. This wheel speed difference represents the difference between the slip sums per side formed from the slip values of the two wheels of one vehicle side. Expressed in a formula, this means:

$$SD=|(v_{VL}+v_{HL})-(v_{VR}+v_{HR})|$$

The indices VL, VR of this formula denominate the left and right front wheels, the indices HL and HR denominating the left and right rear wheels. Consequently, $(v_{VL}+v_{HL})$ is the wheel speed sum of the side of the left wheels, $(v_{VR}+v_{HR})$ being the wheel speed sum of the side of the right wheels of the vehicle. The absolute value of the difference formed from these two sums provides the wheel-speed-difference value SD.

As long as difference SD lies below the speed-dependent threshold illustrated in FIG. 3 and defined in this example by the straight lines $th_1, th_2, th_3$ there will be no management of the braking pressure build-up gradient of the wheel on the inside of the corner. Consequently, $p=p_{max}$.

If the difference SD comes up to and exceeds threshold $th_1$ or $th_2$ or $th_3$, respectively, reduction of the braking pressure build-up gradient will come on. The measure of reduction of the braking pressure gradient from the original value of $p=p_{max}$ down to a value of $p=p_{min}$, including even the possibility of $p_{min}$ becoming zero, depends on the amount of the wheel-speed-difference value or on how much these thresholds $th_1$ or $th_2$ or $th_3$, respectively, have been exceeded. The hatched band "B" in FIG. 3 symbolically represents the range which may be penetrated by the slip difference. The reduction of the braking pressure build-up gradient depends on the "depth of penetration" into this range.

Figure 4:
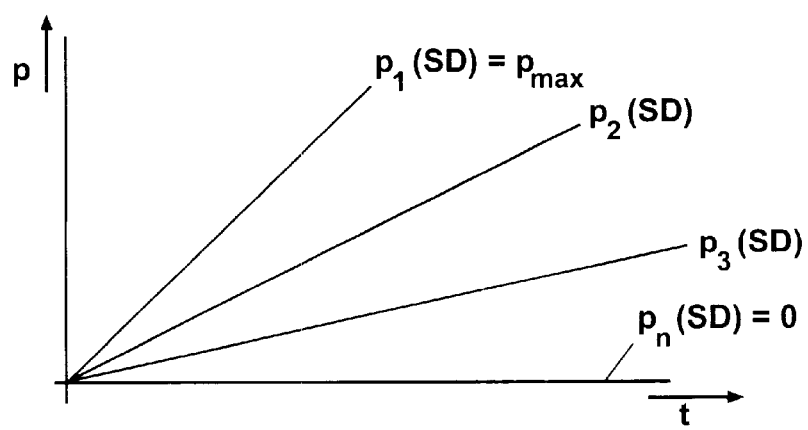
FIG. 4 is likewise a graph of examples of predetermined pressure build-up gradients.

FIG. 4 shows the pressure variation p as a function of time. The straight lines $p_1(SD)$, $p_2(SD)$, $p_3(SD)$ and $p_n(SD)$ are examples of braking pressure build-up gradients which may result. The highest gradient $p_1(SD)=p_{max}$ represents the maximum gradient implied by the system. This gradient applies as long as the difference value SD lies under the threshold values $th_1, th_2, th_3$. If, for instance, the difference value SD considerably exceeds the threshold values the inventive special control will adjust a braking pressure build-up gradient $p_3$ or such a braking pressure build-up gradient will be the result, respectively. The horizontal line in FIG. 4 symbolizes the limit value, namely gradient $p_n(SD)=0$.

Figure 3:
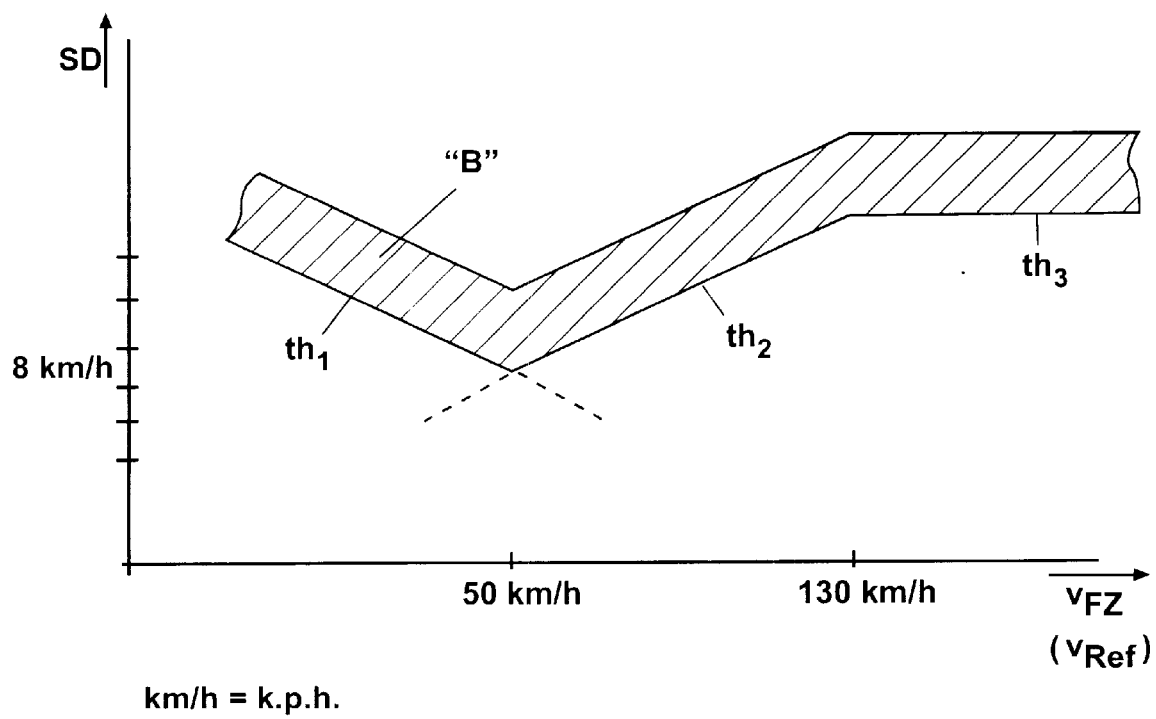
FIG. 3 is a graph of the difference threshold value in dependence on the (reference) speed of the vehicle.

The variation of the slip threshold in accordance with FIG. 3 depends on the respective vehicle type. In the illustrated example it proved advantageous with a vehicle speed of approximately 50 k.p.h. to switch over to the inventive special control as early as of a relatively small slip difference of, e.g., SD=8 k.p.h. With lower and higher vehicle speeds, the thresholds are higher. In the present example, the threshold ($th_3$) remains constant as of approximately 130 k.p.h.

What is claimed is:

1. A method for improving the control behavior of an anti-lock control system of a four-wheel, two-axle vehicle, including the steps of:

measuring rotational behavior of the vehicle wheels;

deriving a vehicle reference speed;

obtaining criteria for identifying a cornering situation and the direction of cornering from the rotational behavior of the vehicle wheels;

instead of a standard control mode, putting into operation a special control mode when cornering is identified, said special control mode causing a reduction of braking pressure on at least one wheel of the group consisting of the front wheel on the inside of the corner and the rear wheel on the inside of the corner already in a partial braking range; and reducing the gradient of a braking pressure build-up on the at least one wheel in the partial braking range when a threshold value of a wheel speed difference is exceeded, which difference is the difference between the wheel speed sums per vehicle side formed from the speeds of the two wheels of each side of the vehicle, the reduction taking place in dependence on the extent by which the threshold value of the wheel speed difference is exceeded.

2. A method as claimed in claim 1, wherein the threshold value of the wheel speed difference varies in dependence on the vehicle reference speed.

3. A method as claimed in claim 2, wherein the gradient of the braking pressure build-up varies between a maximum value which applies below the threshold value of the wheel speed difference and a minimum value which applies in case of a high difference.

4. A method as claimed in claim 2, wherein the gradient of the braking pressure build-up is adjusted by introducing the braking pressure via an inlet valve, actuated in a pulsed manner at a pulse-and-pulse-pause ratio, and by varying the pulse-and-pulse-pause ratio.

* * * * *